United States Patent Office 3,519,221
Patented July 7, 1970

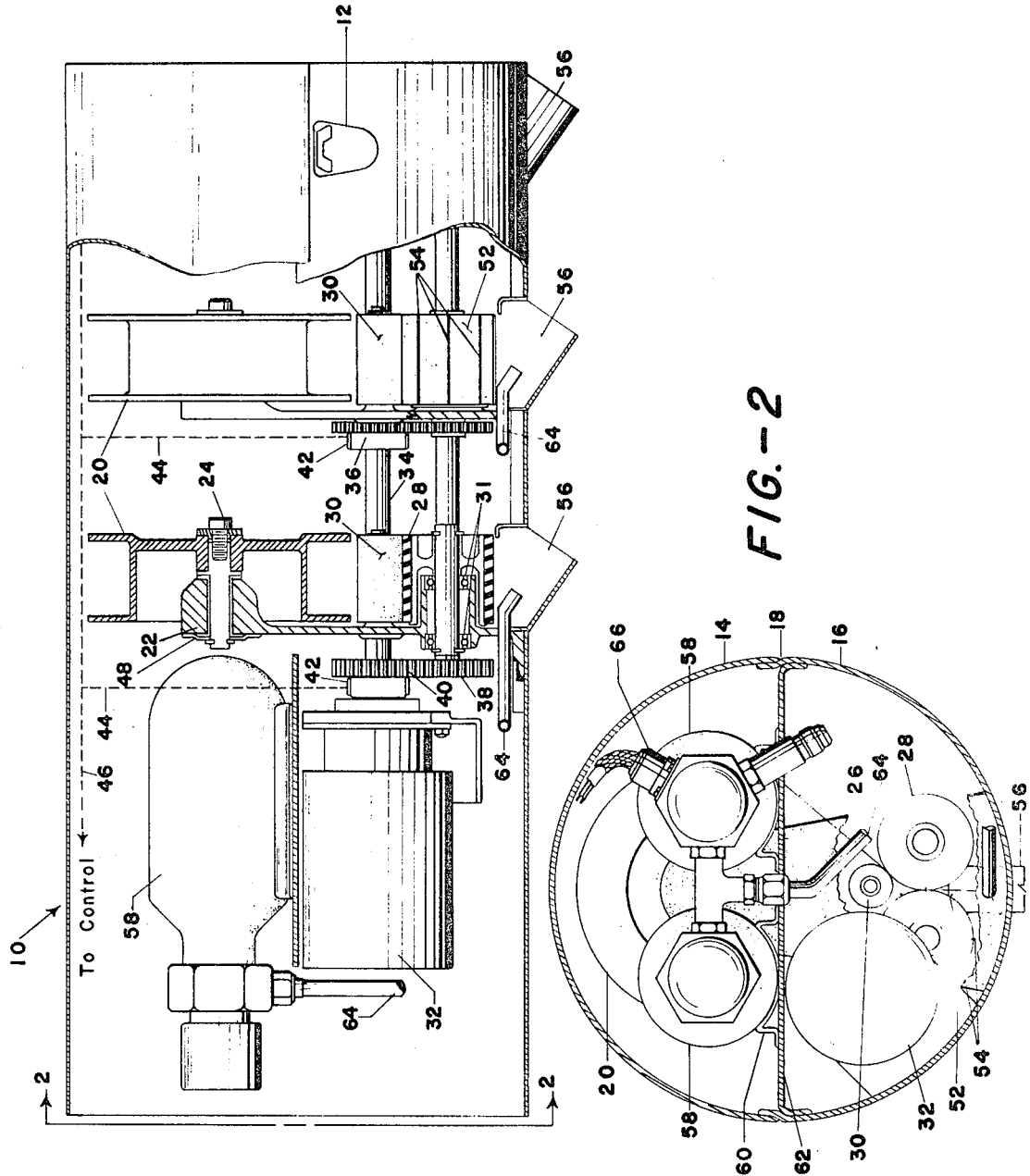

3,519,221
AUTOMATIC CHAFF CUTTING AND
DISPENSING APPARATUS
Harry T. Kifor, Canton, Ohio, assignor to Goodyear
Aerospace Corporation, Akron, Ohio, a corporation of
Delaware
Filed June 13, 1967, Ser. No. 645,688
Int. Cl. H01q 15/14; F41f 5/02
U.S. Cl. 343—18                                        5 Claims

ABSTRACT OF THE DISCLOSURE

The invention provides apparatus capable of remotely and automatically cutting and dispensing chaff lengths for selected radar frequencies. It includes a plurality of chaff carrying spools mounted for rotational movement within a pod secured to a vehicle. Means are provided to remove the chaff from the rolls and automatically cut it to desired lengths and simultaneously effect dispersion thereof.

This invention relates to an apparatus for automatically cutting and dispensing radar chaff from an aircraft.

It is the general object of the present invention to provide apparatus which is capable of remotely and automatically cutting and dispensing chaff lengths for a particular radar frequency, which apparatus is also capable of cutting and dispensing at least two different chaff lengths at the same time.

In order to obtain an understanding of the apparatus of the invention, reference should be had to the accompanying drawing wherein:

FIG. 1 is a side elevation, partially in cross section and with parts broken away, of a preferred embodiment of the apparatus of the invention;

FIG. 2 is an end elevation of the apparatus of FIG. 1, as particularly viewed from line 2—2 of FIG. 1.

With reference to the drawing, the numeral 10 generally indicates a pod adapted to be secured to an aircraft (not shown) as by a suitable quick disconnect latch 12. The pod, as best illustrated by FIG. 2, is substantially circular in shape and is formed from a top half portion 14 and a bottom half portion 16 connected at 18. The pod 10 is made from a light, high-strength metal such as aluminum, and the two portions 14 and 16 are easily disengageable from each other to allow quick access into the pod.

Mounted within the pod 10 are the components of the chaff dispensing apparatus of the invention. Basically, this apparatus consists of a plurality of chaff carrying spools 20 journalled on respective spool support arms 22. Pin means 24 secure the chaff carrying spools 20 to their respective support arms 22, the pins being easily removable to allow replacement of the spools 20 when chaff lengths 26 wound thereon have been completely dispensed.

In order to wind or pull the chaff 26 off the respective carrying spools 20, a pair of chaff feed rolls 28 and 30 are journalled, as by bearing boxes 31, in each spool support arm 22. The chaff feed rolls, best illustrated by FIG. 2, are adapted to be driven by a motor 32 mounted to the pod 10. Drive shaft 34, driven by motor 32, extends substantially the length of the pod 10, and a plurality of electrically actuated clutches 36 are secured thereto. Each clutch 36 effects a drive of a respective set of chaff feed rolls 28 and 30 through a pair of drive gears 38 and 40 driven by the clutch 36 upon actuation thereof. A suitable slip ring 42 is positioned on each clutch 36 and drive of each set of drive gears 38 and 40 is controlled by directing an electrical signal to slip ring 42, whereby driving engagement between the clutch 36 and drive gears 38 and 40 is effected. Dotted lines 44 diagrammatically indicate connection of the slip rings 42 with a master control circuit, indicated by dotted line 46. This arrangement allows selective drive of all or any of drive gears 38 and 40, dependent upon actuation of the respective clutch 36 associated therewith.

Upon rotation of chaff feed rolls 28 and 30, the chaff 26 wound on carrying spool 20 will be unrolled in the manner that is best illustrated by FIG. 2. A suitable drag spring 48 is associated with each chaff carrying spool 20 in order to insure that the tension on the chaff 26 will remain constant as it is being unrolled from spool 20.

In order to cut the chaff into various lengths as it is wound off spools 20, a cutter roll 52 is journalled to each support arm 22. The cutter roll 52, as best illustrated by FIG. 2, forms a bight with chaff feed roll 28 on the chaff 26. Imbedded in cutter roll 52 are a plurality of cutting knives 54, which knives cause the chaff 26 to be cut into equal lengths as it passes between chaff feed roll 28 and cutter roll 52. As the cut pieces of chaff fall away from the bight formed between rolls 28 and 52, they fall into a chaff ejector chute 56 of the pod 10 which is connected to the atmosphere. The pieces of chaff thus are dispensed from the pod to act as a radar counter measure.

Of course, it should be understood that the knives 54 imbedded in chaff cutter roll 52 are so spaced as to cut the chaff into the precise lengths required for certain radar frequencies. Also, it is one of the main objects of the invention to utilize cutter rolls which will cut different lengths of chaff than the remaining cutter rolls. For example, the knives 54 imbedded in each cutter roll are spaced a different arcuate distance apart than the knives in the other cutter rolls so that different lengths of chaff are dispensed from each chaff ejector chute 56. The cutter rolls 54 are adapted for quick change removal so that the dispensing pod of the invention can be easily and quickly adapted to cut a variety of chaff lengths for selected radar frequencies.

In order to facilitate dispensing the cut chaff lengths from ejector chute 56, a pair of pressurized air bottles 58 are mounted as by a bracket 60 to a horizontal support plate 62 of the pod 10. Conduit means 64 connect the pressurized air bottle 58 to each of the chaff ejector chutes and a suitable electrically actuated control valve 66 is provided so that the pressurized air in the bottles can be released therefrom to blow the cut chaff pieces from the chaff ejector chutes.

It can be seen from the foregoing description that the objects of the invention have been achieved, particularly by providing a chaff dispenser unit which simultaneously can dispense at least two different lengths of chaff suited for particular radar frequencies. Also use of the clutch and drive gear assembly associated with each chaff spool allows any of the chaff carrying spools to be operated independently of each other if it is desirable to dispense only one chaff length.

While in accordance with the Patent Statutes only one best known embodiment of the invention has been illustrated and described in detail, it is to be particularly understood that the invention is not limited thereto or thereby, but that the inventive scope is defined in the appended claims.

What is claimed is:

1. Apparatus for automatically cutting and dispensing various chaff lengths from an aircraft, including
 a pod secured to the aircraft,
 a plurality of chaff carrying spools mounted for rotational movement within said pod,
 motor means mounted to said pod,
 chaff feed roll means driven by said motor means and associated with each of said chaff carrying spools to feed the chaff therefrom, cutter roll means forming a bight with each of said chaff feed roll means to cut the chaff fed from said spools to a particular wavelength, and means for dispensing the cut chaff pieces from said pod.

2. The combination according to claim 1 wherein said means for dispensing the cut chaff pieces from said pod are chaff ejector chute means mounted to said pod and positioned downstream from the bight formed by the chaff feed roll means and the cutter roll means whereby the cut chaff pieces are caught by and ejected from said chaff ejector chute means into the atmosphere.

3. The combination according to claim 2 and including pressurized air bottle means mounted to said pod, conduit means connecting said air bottle means to each of said chaff ejector chute means, and means for selectively releasing pressurized air from said bottles into said conduit means to effect rapid ejectment of said cut chaff pieces from said chaff ejector chute means.

4. The combination according to claim 1 wherein the chaff on each chaff carrying spool is cut by the particular cutter roll means associated therewith into chaff pieces of a different length for a different radar frequency than the chaff on the other chaff carrying spools.

5. The combination according to claim 4 wherein each chaff carrying spool and the chaff feed roll means and cutter roll means associated therewith can be selectively operated independently of the other chaff carrying spools to cut a particular chaff length.

References Cited

UNITED STATES PATENTS

| | | | |
|---|---|---|---|
| 3,068,472 | 12/1962 | Dell Aria | 343—18 |
| 3,118,336 | 1/1964 | Hampshire | 102—63 X |

RODNEY D. BENNETT, JR., Primary Examiner

B. L. RIBANDO, Assistant Examiner

U.S. Cl. X.R

89—1.5; 102—63